Patented Feb. 20, 1951

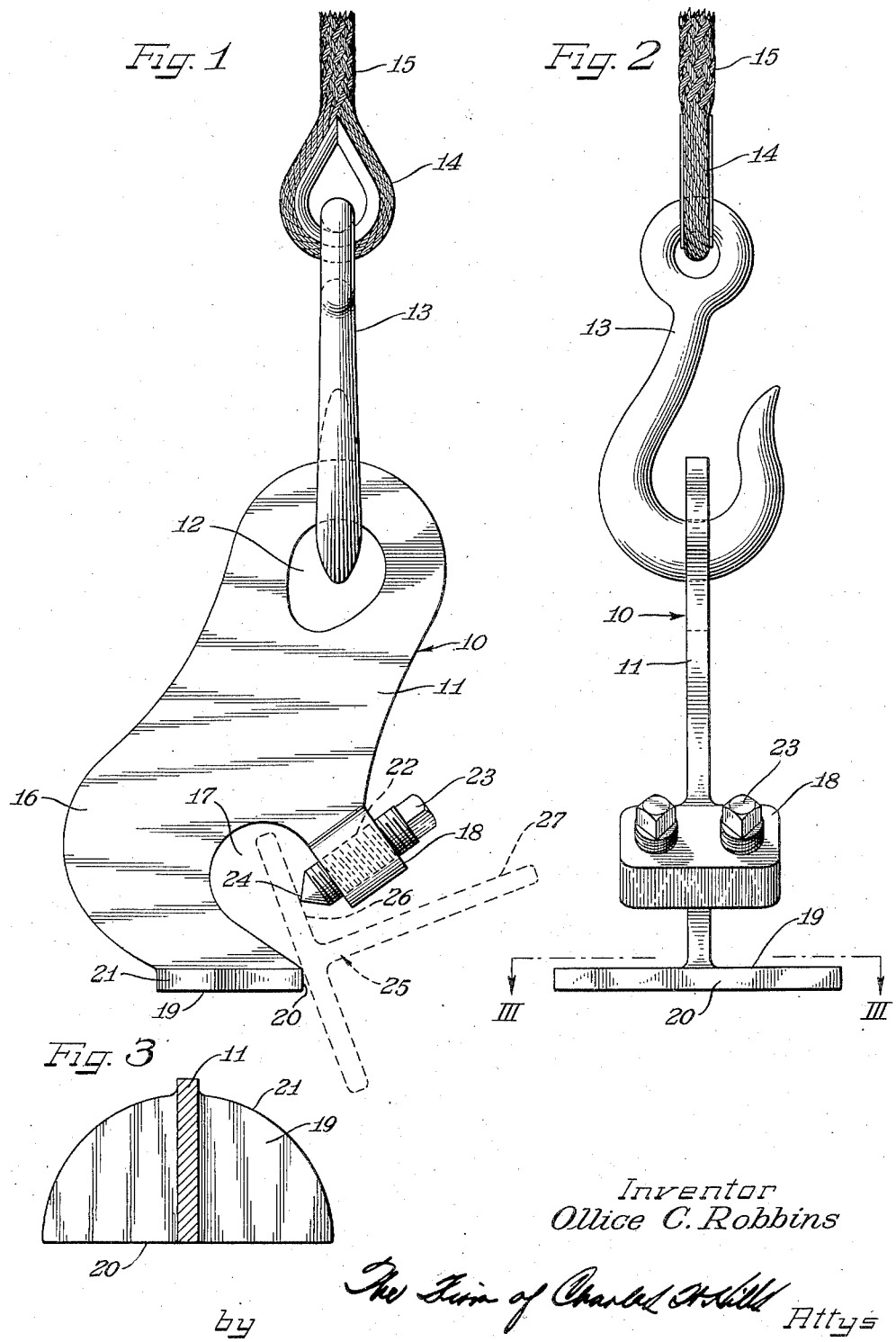

2,542,289

UNITED STATES PATENT OFFICE 2,542,289

BEAM HOOK

Ollice C. Robbins, Berwyn, Ill.

Application April 13, 1948, Serial No. 20,652

2 Claims. (Cl. 294—82)

The present invention relates to a novel type of beam hook and more particularly to a hook for use with lifting devices such as hoisting cranes for the movement of structural beams.

Beam hooks for the lifting of flanged structural beams, such as T-beams, I-beams, and the like, as hereinbefore provided, have generally been employed in pairs to grip either side of the beam during the lifting operation. Single hooks have also been provided by the prior art for the movement of structural beams, but such hooks are unsuitable for general use since they may be employed with only one size or type of beam.

The present invention now provides a novel type of beam hook for engaging the flange of a flanged structural beam so that the beam may be maintained in position within the hook during both lateral and vertical movement of the beam. Only one hook of the present invention is required to move the beam since the weight of the beam itself tends to maintain the beam in gripping engagement with the hook. Further, the hook of the present invention is so designed that it may be employed with beams of various types and sizes.

The beam hook herein provided comprises a steel plate apertured for engagement with the hoisting hook of a hoisting crane or similar lifting device, the plate being provided with a recess or notch for receiving the flange of a structural beam and having a forward transversely extending flange adjacent the aperture carrying a projection or a pair of set screws extending into the notch. A second transverse flange is provided at the lower edge of the plate adjacent the notch. The set screws carried by the first hook flange and one edge of the second hook flange engage opposite sides of the beam flange to maintain the flange in position within the notch. The weight of the beam tends to force the beam flange into more tightly gripping engagement with the set screws and the lower flange of the hook so that the beam is maintained in position within the hook during movement of the hook by the lifting device. The transversely extending lower flange of the beam hook contacts an extended portion of the beam flange to prevent tipping of the beam within the hook. Thus, the set screws and the lower flange of the hook acting against opposite sides of the beam flange maintain the beam in position within the hook while the weight of the beam itself acts to increase the strength of the engagement between it and the hook.

It is, therefore, an important object of the present invention to provide a single beam hook by means of which a structural beam may be moved, the weight of the beam causing the same to be maintained in position within the hook.

It is another important object of the present invention to provide a beam hook for the movement of a structural beam comprising a plate notched to receive a portion of the beam, the plate carrying a projection extending into the notch for engaging one surface of the beam and a transversely extending flange for engaging the opposite surface of the beam with the weight of the beam itself forcing the beam into tighter engagement with the projection and the hook flange to maintain the beam in position within the hook.

It is a still further important object of the present invention to provide a beam hook for the movement of flanged structural beams which comprises a steel plate having a rearwardly protruding portion and a notch formed in the plate opposite the protruding portion, a forwardly extending flange adjacent the notch carrying set screws extending into the notch, and a transversely extending flange secured to the lower edge of the plate adjacent the notch, the set screws and the hook flange bearing against opposite surfaces of the flange of the beam with the weight of the beam itself forcing the beam flange into tighter engagement with said set screws and said beam flange.

On the drawings:

Figure 1 is a side elevational view of the beam hook of the present invention;

Figure 2 is a front elevational view of the beam hook of Figure 1; and

Figure 3 is a sectional view taken along the line III—III of Figure 2.

As shown on the drawings:

The reference numeral 10 refers generally to a beam hook of the present invention. The hook 10 comprises a body portion or plate 11 apertured adjacent one end as at 12 to receive a hoisting hook 13 attached to a bight 14 of a woven wire rope 15 carried by a hoisting crane or similar lifting device (not shown). As illustrated, the plate 11 hangs vertically when suspended from the lifting hook 13.

To facilitate description of the present invention, the right-hand edge of the hook 10 as shown in Figure 1 is referred to as the "forward edge" of the plate, while the left-hand edge is called the "rear edge."

The rear edge of the plate 11 is curved at the lower portion of the plate to provide a rearwardly extending protuberance 16. The forward edge of the plate 11 is notched as at 17 to provide an opening in the lower forward portion of the plate 11, the opening extending into the lower central portion of the plate. The plate 11 is also provided with a forwardly extending transverse flange 18 overlying the notch 17, and a second flange 19 secured to the bottom of the plate 11 to provide a transversely extending straight forward edge 20 underlying the lower forward edge of the notch 17 and a curved rear edge 21. Thus, the forward edge 20 of flange 19 is positioned generally beneath flange 18. The flanges 18 and 19 may be cast integrally with plate 11, or may be formed separately and secured to the plate 11, as by welding.

The forward open edges of the notch 17 are defined by flange 18 and the forward edge 20 of flange 19. Internally threaded, transversely extending apertures 22 are provided in flange 17 to threadedly receive set screws 23 having pointed tips 24 extending into the notch 17 in vertically spaced relation to the flange edge 20.

In employing the beam hook of the present invention to hoist or otherwise move structural members, such as the T-beam 25, as shown in dotted outline in Figure 1, the hook is positioned on a beam 25 by slacking off the rope 15 and fitting the hook 10 to a flange of the beam so that one side flange 26 of the beam extends into notch 17 with the web 27 of the beam 25 extending forwardly of the notch 17 to underlie flange 18. As illustrated in Figure 1, the pointed tips 24 of set screws 23 will engage the inner side surface of flange 26 while the forward edge 20 of the flange 19 will engage the opposite side of the flange 26. As the beam is lifted by means of the hook, the weight of the beam 25 will cause the flange to be forced into tight surface engagement with the screw 23 and the flange 19, causing the screw tips 24 and the edge 20 to bite into the beam. Following the hoisting of the beam 25 into the desired position and laying the beam on a surface, the hoist is operated to slack off the hoisting rope 15, and the hook 10 will freely disengage itself from the beam 25 without the necessity of manual removal by the operator.

The center of gravity of beam 25 is located along the web 27, the exact location of the center of gravity being determined by the size of the beam and the relative weights of the flange and the web. However, the center of gravity will be located in the web 27 forwardly of the point of contact of the edge 20 and the screws 23 with the beam flange. When the flange 26 of the beam is inserted into the notch 17 for engagement by screws 23 and edge 20, the edge 20 will act as a fulcrum and the beam 25 will tend to rotate about the fulcrum since the weight of the beam, effectively concentrated at the center of gravity in the web 27, acts vertically downward. Thus, the forward end of the web tends to move downwardly, rotating the flange 26 in a clockwise direction as viewed in Figure 1 and into tighter engagement with the screws 23. Thus it may be seen that the weight of the beam 25 will tend to force the flange 26 into tighter engagement with the screws 23 to maintain the beam in position within the hook 10.

It is unnecessary to employ more than one hook 10 to move the beam since the beam will tend to remain in position within the hook. The provision of the straight forward edge 20 of flange 19 also aids in maintaining the beam in alignment within the hook 10. Prior to the movement of a beam, such as the beam 25, by means of the hook 10, the hook is placed at the approximate longitudinal center of gravity of the beam. It is not necessary to place the hook at the exact longitudinal center of gravity of the beam since, by the provision of the straight edge 20, the beam will be prevented from moving or tipping within the hook 10. Two or more beam hooks may be employed for extra long beams and in that case the hooks would be spaced longitudinally along the beam to balance the same.

The rearwardly extending protuberance 16 of the hook 10 is provided so that the hook may be maintained in substantially vertical position when in actual use in moving a beam as shown in Figure 1. Following the positioning of the beam 25 within the hook, as hereinbefore described, and during the hoisting operation, the hook and the beam will adjust their position relative to the hoisting hook 13 until the combined centers of gravity of the hook and the beam will be in vertical alignment with the hook 13 and the rope 15. The projection 16 tends to place the center of gravity of the hook itself rearwardly of a vertical line drawn through the center of the hoisting hook 13 and the beam hook 10 as illustrated in Figure 1. Thus, the rearwardly placed center of gravity of the hook tends to maintain the position of the hook during the hoisting operation in substantially the position shown in Figure 1. This prevents excessive movement of the hook 10 about the hook 13 so that the combined centers of gravity of the hook and the beam may come in alignment with the center of the hook 13.

To aid in maintaining the hook 10 in substantially the position shown in Figure 1, the projection 16 may be weighted or made thicker in cross-section, or the projection may be made more prominent, so as to further rearwardly displace the center of gravity of the hook 10.

The provision of the adjustable set screws 23 makes possible the use of the hook with varying sizes and shapes of beams. Thus, although the hook of the present invention has been particularly described as employed in the hoisting of T-beams, the hook may also be employed for the movement of I-beams, L-beams, angle irons, or other similar structural beams. Of course, if the hook is to be employed to move only one size or type of beam, the set screws 23 may be replaced by fixed pointed projections extending into aperture 17.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A beam hook which assumes and maintains gripping engagement with a flange of a structural beam when the same is fully supported by a single beam hook; said beam hook comprising a unitary rigid body portion having, when in beam supporting position, upper means for freely pivoting attachment to a lifting device and a lower laterally opening notch for receiving a beam flange; said notch having a lower jaw extending on both sides of said body portion and provided with a straight edge for line engagement with one surface of said beam flange; and a wedge pin for engaging an opposite surface of said beam flange, said pin projecting downwardly from the upper surface of said notch with its free end above and in spaced relationship to said straight edge by a distance substantially greater than the thickness of the beam flange to be engaged; the geometrical relationship between said upper attachment means, said lower jaw edge and said wedge pin end being such that, when the center of gravity of the beam lies on one side of the vertical plane through the upper attachment means, the wedge pin end and the straight edge lie on the other side of said plane, and sufficient gripping engagement is automatically maintained on said beam flange by said edge and wedge pin to prevent the beam from falling out of such engagement when fully supported by the single beam hook.

2. A beam hook which assumes and maintains gripping engagement with a flange of a structural beam when the same is fully supported by a single beam hook; said beam hook comprising a unitary rigid body portion having when in beam-supporting position upper means for freely pivoting attachment to a lifting device and a lower laterally opening notch for receiving a beam flange; a lateral flange extending on both sides of said body portion and provided with a terminal straight edge for line engagement with one surface of said beam flange; and a pair of adjustable wedge pins for engaging an opposite surface of said beam flange; said pins projecting downwardly from the upper surface of said notch with their free ends above and in spaced relation to said straight edge by a distance substantially greater than the thickness of said beam flange to be engaged; the geometrical relationship between said upper attachment means, said flange terminal edge and said wedge pin ends being such that, when the center of gravity of the beam lies on one side of a vertical plane through the upper attachment means, the wedge pin end and flange edge lie on the other side of said plane, and sufficient gripping engagement is automatically maintained on the beam flange by said terminal edge and said wedge pin to prevent the beam from falling out of such engagement when fully supported by the single beam hook; said wedge pin ends being adjustable with respect to said terminal edge to vary the distance therebetween, thereby accommodating beams having flanges of varying thickness.

OLLICE C. ROBBINS.

REFERENCES CITED

The following references are of record in the file of this patent:

UNITED STATES PATENTS

| Number | Name | Date |
| --- | --- | --- |
| 1,303,345 | McFeaters | May 13, 1919 |
| 1,834,503 | Smith | Dec. 1, 1931 |
| 2,079,240 | Bruns | May 4, 1937 |
| 2,412,627 | McGowan | Dec. 17, 1946 |